US008867453B2

(12) United States Patent
Khan

(10) Patent No.: US 8,867,453 B2
(45) Date of Patent: Oct. 21, 2014

(54) SYSTEM AND METHOD FOR SUBCARRIER ALLOCATION SIGNALING IN A MULTICARRIER WIRELESS NETWORK

(75) Inventor: Farooq Khan, Allen, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 1513 days.

(21) Appl. No.: 11/708,177

(22) Filed: Feb. 20, 2007

(65) Prior Publication Data

US 2007/0248046 A1  Oct. 25, 2007

Related U.S. Application Data

(60) Provisional application No. 60/794,484, filed on Apr. 24, 2006.

(51) Int. Cl.
*H04W 4/00* (2009.01)
*H04W 88/08* (2009.01)
*H04W 72/04* (2009.01)
*H04W 72/08* (2009.01)

(52) U.S. Cl.
CPC .............. *H04W 72/04* (2013.01); *H04W 88/08* (2013.01); *H04W 72/048* (2013.01); *H04W 72/08* (2013.01)
USPC ........ 370/329; 370/343; 455/450; 455/452.1; 455/452.2; 455/454; 455/451

(58) Field of Classification Search
USPC ............ 370/329, 343; 455/450, 452.1, 452.2, 455/454, 451
See application file for complete search history.

(56) References Cited

U.S. PATENT DOCUMENTS

| 6,404,778 B1* | 6/2002 | Hayashi et al. ............... 370/470 |
| 7,460,466 B2* | 12/2008 | Lee et al. ...................... 370/208 |
| 2006/0013182 A1* | 1/2006 | Balasubramanian et al. 370/343 |
| 2007/0206525 A1* | 9/2007 | Miller et al. .................. 370/321 |
| 2009/0207829 A1* | 8/2009 | Peng et al. .................... 370/344 |

* cited by examiner

*Primary Examiner* — Justin Lee

(57) ABSTRACT

A base station for use in an orthogonal frequency division multiplexing (OFDM) network that communicates with a plurality of subscriber stations in a coverage area of the OFDM network. The base station allocates subbands to the subscriber stations for communication in an uplink and in a downlink. Each subband comprises a group of subcarriers. The base station allocates one of: i) a plurality of consecutive subbands and ii) a plurality of non-consecutive subbands to a first subscriber station according to at least one selectable criteria. The at least one selectable criteria comprises a channel quality value or a mobility value associated with the first subscriber station, or an operating mode of the base station. The base station allocates non-consecutive subbands or consecutive subbands depending on the at least one selectable criteria. The base station allocates non-consecutive subbands using a bitmap indicator and allocates consecutive subbands using a start-end indicator.

14 Claims, 10 Drawing Sheets

| SB1 (SS 115) | SB2 (SS 115) | SB3 (SS 115) | SB4 | SB5 | SB6 | SB7 | SB8 (SS 115) | SB9 (SS 115) | SB10 (SS 115) | SB11 (SS 115) | SB12 (SS 115) |

BITMAP = [111000011111]

FIG. 3A

| SB1 | SB2 | SB3 | SB4 (SB 116) | SB5 (SB 116) | SB6 (SB 116) | SB7 (SB 116) | SB8 | SB9 | SB10 | SB11 | SB12 |

BITMAP = [000111100000]

FIG. 3B

SYSTEM AND METHOD FOR SUBCARRIER ALLOCATION SIGNALING IN A MULTICARRIER WIRELESS NETWORK

CROSS-REFERENCE TO RELATED APPLICATIONS AND CLAIM OF PRIORITY

The present application is related to U.S. Provisional Patent No. 60/794,484, entitled "Resource Block Allocation Signaling In An OFDM System", filed Apr. 24, 2006. Provisional Patent No. 60/794,484 is assigned to the assignee of the present application. The subject matter disclosed in Provisional Patent No. 60/794,484 is hereby incorporated by reference. The present application hereby claims priority under 35 U.S.C. §119(e) to Provisional Patent No. 60/794,484.

TECHNICAL FIELD OF THE INVENTION

The present disclosure relates generally to wireless communications and, more specifically, to an apparatus and method for control signaling scheme for allocating subcarriers to subscriber stations in an orthogonal frequency division multiplexing (OFDM) network or an orthogonal frequency division multiple access (OFDMA) network.

BACKGROUND OF THE INVENTION

Conventional orthogonal frequency division multiplexing (OFDM) networks and orthogonal frequency division multiple access (OFDMA) network improve channel reliability by spreading and/or coding data traffic and control signals over multiple subcarriers (i.e., tones). Different user devices (i.e., subscriber stations, mobile stations, etc.) are allocated different sets of subcarriers (or tones) for transmitting and receiving the data and control signals. The subcarrier frequencies are orthogonal to each other, thereby minimizing interference between user devices.

OFDM techniques are particularly advantageous in multiple-input, multiple output (MIMO) wireless networks that employ multiple antennas (i.e., Smart antennas) to transmit OFDM signals to the user devices. However, in conventional MIMO techniques based on OFDM transmission, the same subband (or set of subcarriers) is allocated to a given user device from each of the transmit antennas. However, due to independent fading from each of the transmit antennas, the user device may experience different channel quality for each of the transmit antennas even for the same subband. Therefore, transmitting on the same subband from each antenna for each user devices results in less than optimal performance, because the subband selected for transmission may not be good on each of the transmit antennas.

Additionally, conventional MIMO techniques allocate subcarrier to subscriber stations using inefficient control signaling schemes that create a large amount of overhead. In some conventional systems, a subscriber station is allocated to a set of subcarriers using a control message containing a bitmap. The bitmap contains a Logic 1 or 0 for each subcarrier in the frequency band. Thus, a subscriber station is allocated to 64 subcarriers out of a total of 512 subcarriers by means of a 512-bit bitmap containing 64 Logic 1 values at the allocated subcarriers.

Alternatively, groups of subcarriers (i.e., subbands) may be allocated together. Thus, for example, the 512 subcarriers may be divided into 16 groups (or subbands), each subband (SB) containing 32 subcarriers (contiguous or non-contiguous). These subbands may be allocated by a control message containing a 32-bit bitmap. In still another embodiment, the control message may allocate logically sequential subbands using a start-end indicator that identifies the first and the last of the sequential subbands.

Therefore, there is a need in the art for improved apparatuses and methods for transmitting OFDM signals from a multi-antenna OFDM transmitter to an OFDM receiver. In particular, there is a need for a multi-antenna OFDM base station that uses an efficient control messaging scheme for allocating multiple user devices (e.g., subscriber stations) to selected subbands or subcarrier groups.

SUMMARY OF THE INVENTION

In one embodiment of the present disclosure, a base station is provided for use in an orthogonal frequency division multiplexing (OFDM) network capable of communicating with a plurality of subscriber stations in a coverage area of the OFDM network. The base station is capable of allocating subbands to the plurality of subscriber stations for communication in an uplink and in a downlink. Each of the subbands comprises a group of subcarriers. The base station allocates one of: i) a plurality of consecutive subbands and ii) a plurality of non-consecutive subbands to a first subscriber station according to at least one selectable criteria.

In one embodiment, the at least one selectable criteria comprises a channel quality value associated with the first subscriber station. In another embodiment, the at least one selectable criteria comprises a mobility value associated with the first subscriber station. In still another embodiment, the at least one selectable criteria comprises an operating mode of the base station.

The base station allocates non-consecutive subbands or consecutive subbands to the first subscriber station depending on the at least one selectable criteria. The base station allocates the non-consecutive subbands using a bitmap indicator and allocates the consecutive subbands using a start-end indicator.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B illustrate control signaling for subband allocation using a bitmap scheme;

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure is directed to apparatuses and algorithms for transmitting from a multiple antenna base station to a subscriber station (i.e., user device) in an orthogonal frequency division multiplexing (OFDM) wireless network. The base station uses multiple-input, multiple-output (MIMO) antennas to implement spatial division multiplexing techniques. Unlike conventional MIMO implementations, the disclosed base station may transmit to the same subscriber station from multiple antennas using different subcarriers on each antenna, depending on the fading of the subcarriers from each antenna.

The present disclosure is related to U.S. patent application Ser. No. 11/389,708, entitled "System And Method For Subcarrier Allocation In A Multicarrier Wireless Network" and filed Mar. 27, 2006, and to U.S. patent application Ser. No. 11/390,056, entitled "System And Method For Dynamic Allocation Of ARQ Feedback Resource In A Multi-Carrier Wireless Network" and filed Mar. 27, 2006. patent application Ser. Nos. 11/389,708 and 11/390,056 are assigned to the assign of the present disclosure and are hereby incorporated by reference as if fully set forth herein.

Figure 1:
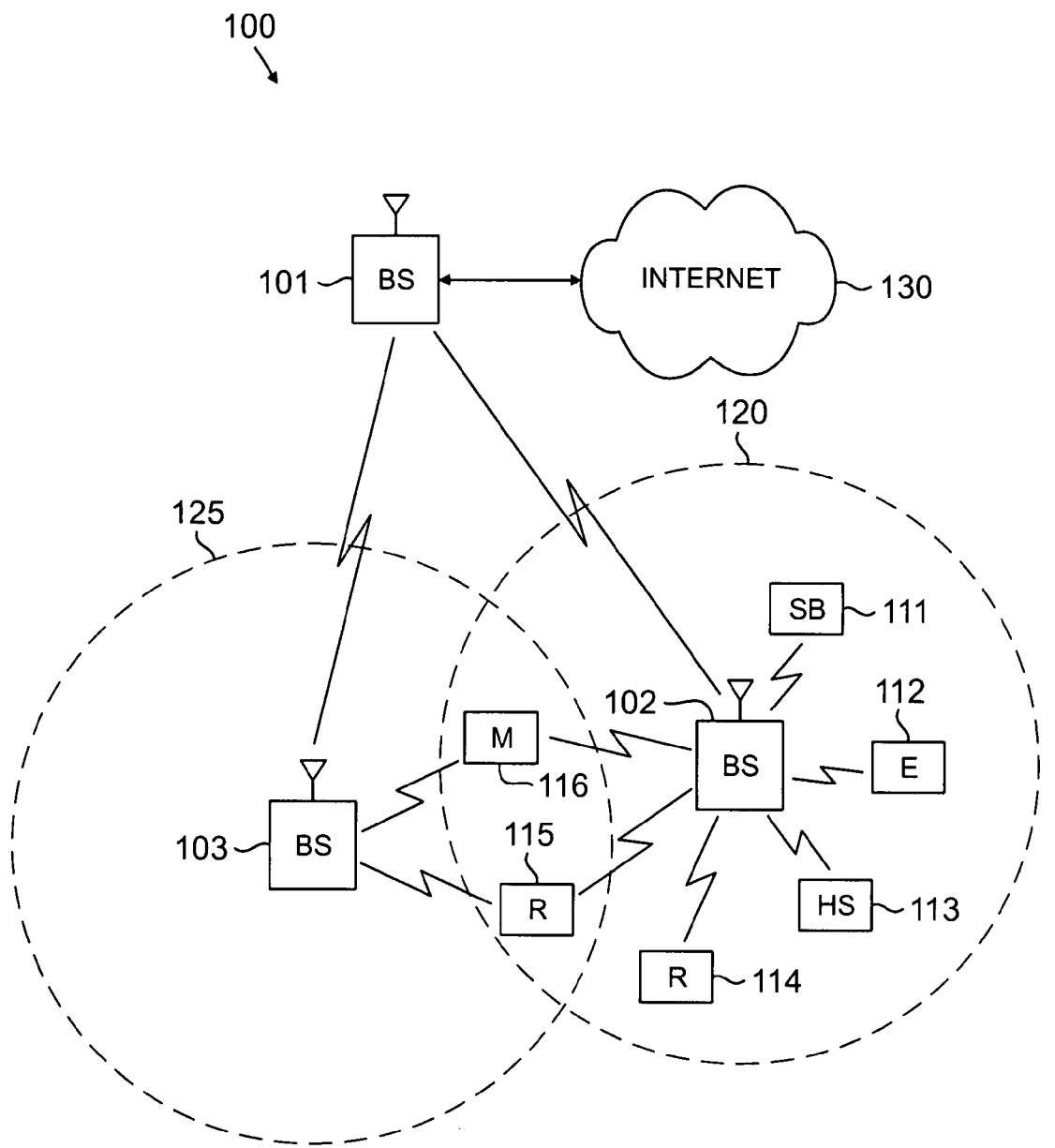
FIG. 1 illustrates an exemplary OFDM wireless network that allocates subbands to each subscriber station using a control signaling scheme according to the principles of the disclosure.

FIG. 1 illustrates exemplary orthogonal frequency division multiplexing (OFDM) wireless network 100, which allocates subbands (or groups of subcarriers) to each subscriber station using a control signaling scheme according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

In an advantageous embodiment of the present disclosure, each one of base stations 101-103 may use multiple antennas to transmit data to each subscriber station in the downlink and to receive data from each subscriber station in the uplink. According to the principles of the present disclosure, each one of base stations 101-103 is capable of transmitting data to a selected subscriber station using a first subband (or group of subcarriers) on a first antenna and a different second subband on a second antenna. Wireless networks capable of transmitting data to a selected subscriber station using different subbands on different antennas are disclosed in U.S. patent application Ser. Nos. 11/389,708 and 11/390,056.

For example, BS 102 may transmit downlink data to SS 116 from a first antenna (ANT1) using a first group of 64 subcarriers (i.e., Subband1) and may simultaneously transmit downlink data to SS 116 from a second antenna (ANT2) using a second group of 64 subcarriers (i.e., Subband2). At the same time, BS 102 may transmit downlink data to SS 115 from antenna ANT1 using Subband2 and may simultaneously transmit downlink data to SS 115 from antenna ANT2 using Subband1. Since the fading at the receiver from each antenna is independent of the other antennas, the allocation of subbands at each antenna is independent of the allocations of subbands at other antennas. Thus, the allocations of subbands are done on an antenna-by-antenna basis.

Figure 2:
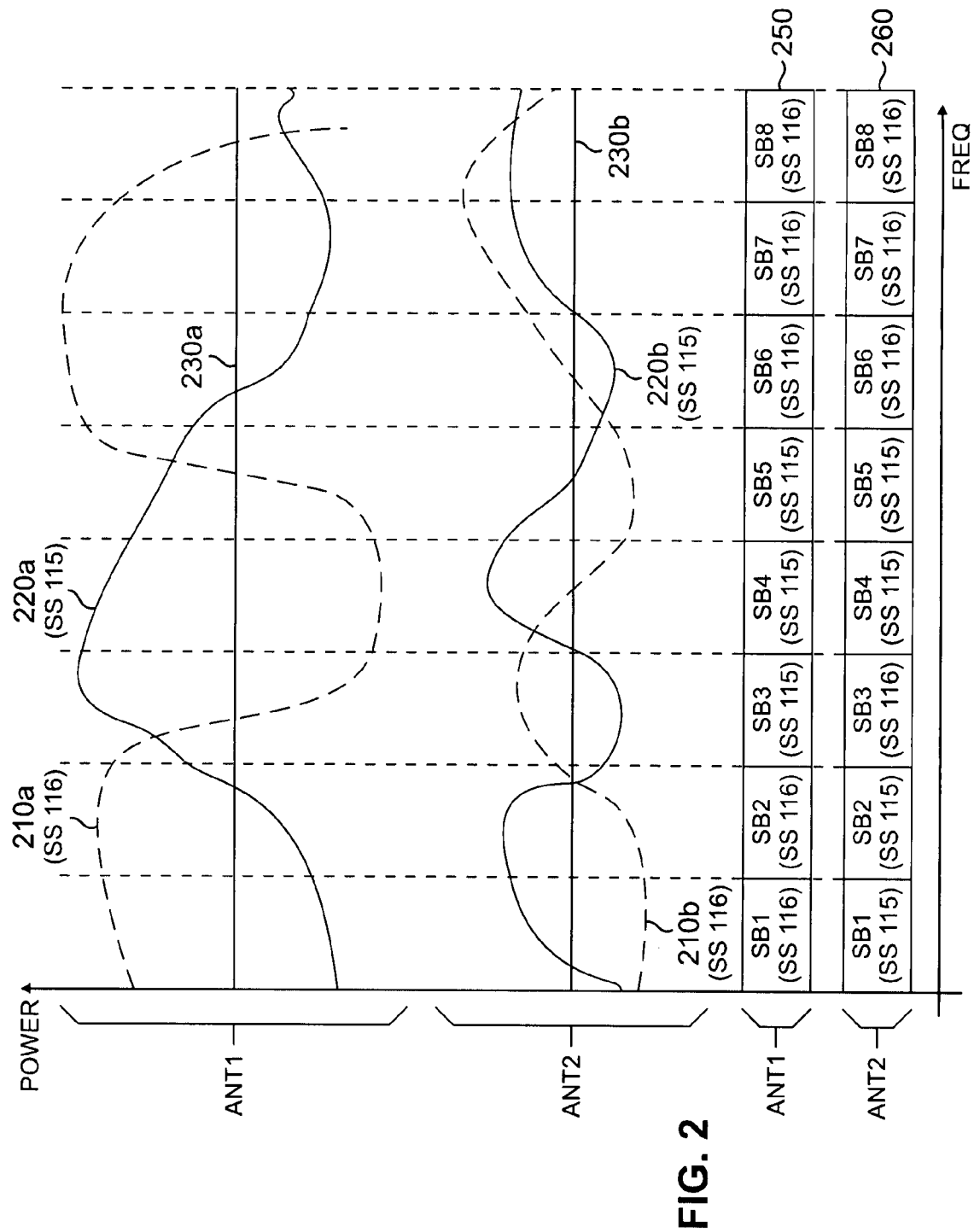
FIG. 2 illustrates the allocation of subcarriers in a wireless network using a control signaling scheme according to the principles of the disclosure.

FIG. 2 illustrates the allocation of subcarriers in wireless network 100 using a control signaling scheme according to the principles of the present disclosure. In this example, a total of 512 OFDM subcarriers (or tones) are divided into 8 groups (or subbands) of 64 contiguous subcarriers (SCs) each. By way of example, the first subband, SB1, contains subcarriers SC1-SC64, the second subband, SB2, contains subcarriers SC65-SC128, and so forth. The eighth (last) subband, SB8, contains subcarriers SC449-SC512.

A given subscriber station (e.g., SS 116 or SS 115) may be allocated one or more of these subbands. In a conventional base station, a MIMO spatial multiplexing antenna array using OFDM allocates the same subband on each transmit antenna to the same subscriber station. Thus, in a conventional base station, if SS 116 is allocated subband SB1 on antenna ANT1, then SS 116 must also be allocated subband SB1 on antenna ANT2.

In FIG. 2, the eight subbands, SB1-SB8, are allocated according to channel fading at the receiver for the case of two transmit antennas, ANT1 and ANT2, and two subscriber stations, SS 115 and SS 116. The received signals at SS 116 and SS 115 from each of the two transmit antennas experience frequency-selective fading due to multipath effects. In case of uncorrelated antennas, the channel qualities from each of transmit antennas ANT1 and ANT2 at SS 115 and SS 116 are independent. Also, the channel from base station (BS) 102 to each of SS 115 and SS 116 is also independent due to the different locations of SS 115 and SS 116 within a cell. Therefore, SS 115 or SS 116 experience independent fading from each of the two transmit antennas as shown in FIG. 2.

Curve 230a represents a flat fading characteristic at antenna ANT1. Dotted-line curve 210a represents the frequency selective fading of the downlink signal from antenna ANT1 seen by the receiver of SS 116. Solid-line curve 220a represents the frequency selective fading of the downlink signal from antenna ANT1 seen by the receiver of SS 115.

Curve 230b represents a flat fading characteristic at antenna ANT2. Dotted-line curve 210b represents the frequency selective fading of the downlink signal from antenna ANT2 seen by the receiver of SS 116. Solid-line curve 220a represents the frequency selective fading of the downlink signal from antenna ANT2 seen by the receiver of SS 115.

A subscriber station is scheduled for transmission on a given subband on a given antenna if its channel quality on that particular subband on for a particular antenna is better than all the other subscriber station in the cell. It is also possible to take other QoS criteria into account when selecting subscriber station for transmission. In the two subscriber station example in FIG. 2, SS 116 is in a relative up-fade on antenna ANT1 compared to SS 115 on subbands SB1, SB2, SB6, SB7 and SB8. Similarly, SS 115 is in a relative up-fade on antenna ANT1 compared to SS 116 on subbands SB3, SB4 and SB5. Thus, the relative fading at antenna ANT1 is used to determine subband allocation 250 for antenna ANT1 near the bottom of FIG. 2.

Likewise, in the two subscriber station example in FIG. 2, SS 116 is in a relative up-fade on antenna ANT2 compared to SS 115 on subbands SB3, SB6, SB7 and SB8. Similarly, SS 115 is in a relative up-fade on antenna ANT2 compared to SS 116 on subbands SB1, SB2, SB4 and SB5. Thus, the relative fading at antenna ANT2 is used to determine subband allocation 260 for antenna ANT2 near the bottom of FIG. 2.

FIGS. 3A and 3B illustrate control signaling for subband allocation using a bitmap indicator scheme. The bitmap indicators in FIGS. 3A and 3B are portions of control channel messages that allocate the subbands to subscriber stations 115 and 116. Generally, subband allocation is done in a control channel message that may carry other control information. In the exemplary embodiments in FIGS. 3A and 3B, it is assumed there are twelve (12) allocatable subbands (or groups of subcarriers), respectively labeled SB1 through SB12.

In FIGS. 3A and 3B, a 12-bit long bitmap indicator is used for signaling purposes. A Logic 1 at a given position, x, in the bitmap indicator indicates that subband SBx is allocated to the subscriber station to which control channel message containing the bitmap indicator is transmitted. Conversely, a Logic 0 at a given position, x, in the bitmap indicator indicates that subband SBx is not allocated to the subscriber station to which control channel message containing the bitmap indicator is transmitted. In FIG. 3A, the bitmap indicator [111000011111] allocates subbands SB1, SB2, SB3, SB8, SB9, SB10, SB11 and SB12 to SS 115. In FIG. 3B, the bitmap indicator [000111100000] allocates subbands SB4, SB5, SB6 and SB7 to SS 116. Thus, twelve (12) bits of overhead are required for each subscriber station in a bitmap indicator approach.

Alternatively, a start-end indicator may be used to allocate consecutive subbands in lieu of a bitmap indicator. For example, four (4) bits may be used to indicate the first subband in a consecutive sequence of subbands and another four (4) bits may be used to indicate the last subband in the consecutive sequence. This results in a total of eight (8) bits of overhead. Thus, for example, the subband allocation in FIG. 3B may be indicated by the start-stop indicator [0100 0111], which indicates to SS 116 that four consecutive subbands starting at subband SB4 and ending at subband SB7 are being allocated to SS 116.

Alternative types of start-end indicators may be used to allocate consecutive subbands in lieu of a bitmap indicator. For example, four (4) bits may be used to indicate the first subband in a consecutive sequence of subbands and another four (4) bits may be used to indicate the total number, n, of subbands in the consecutive sequence. This also results in a total of eight (8) bits of overhead. Thus, for example, the subband allocation in FIG. 3B may be indicated by the start-end indicator [0100 0100], which indicates to SS 116 that four consecutive subbands (i.e., n=4) starting at subband SB4 are being allocated to SS 116.

It should be noted that the consecutive resource block allocation results in smaller signaling overheads. However, there may be waste of resources if a small number of subscribe stations are present or if subbands with suboptimal channel quality are allocated to subscriber stations. Either way, the system performance and capacity is degraded. It is also noted that the overhead difference between consecutive subband allocation and non-consecutive subband allocation increases as the number of allocatable subbands increases.

Figure 4:
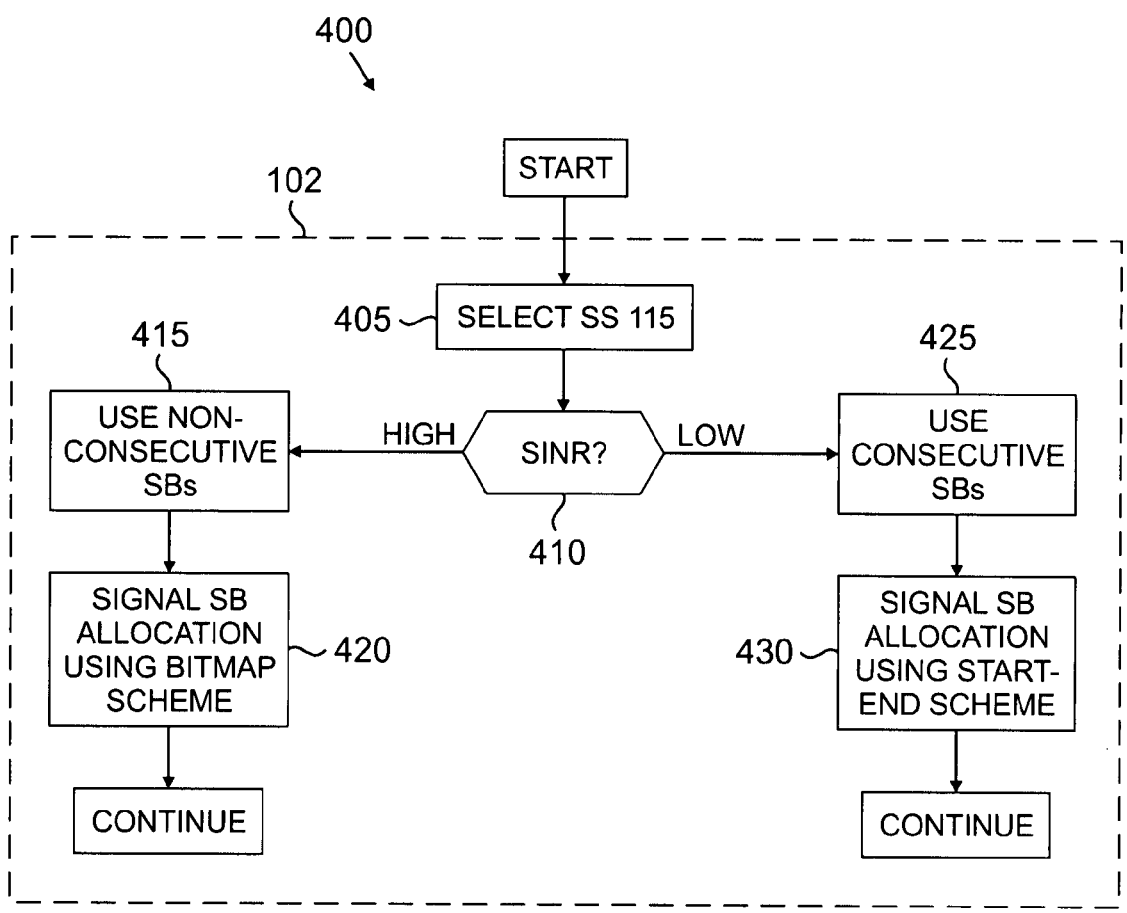
FIG. 4 is a flow diagram illustrating the allocation of subbands according to a first embodiment of the disclosure.
Figure 5:
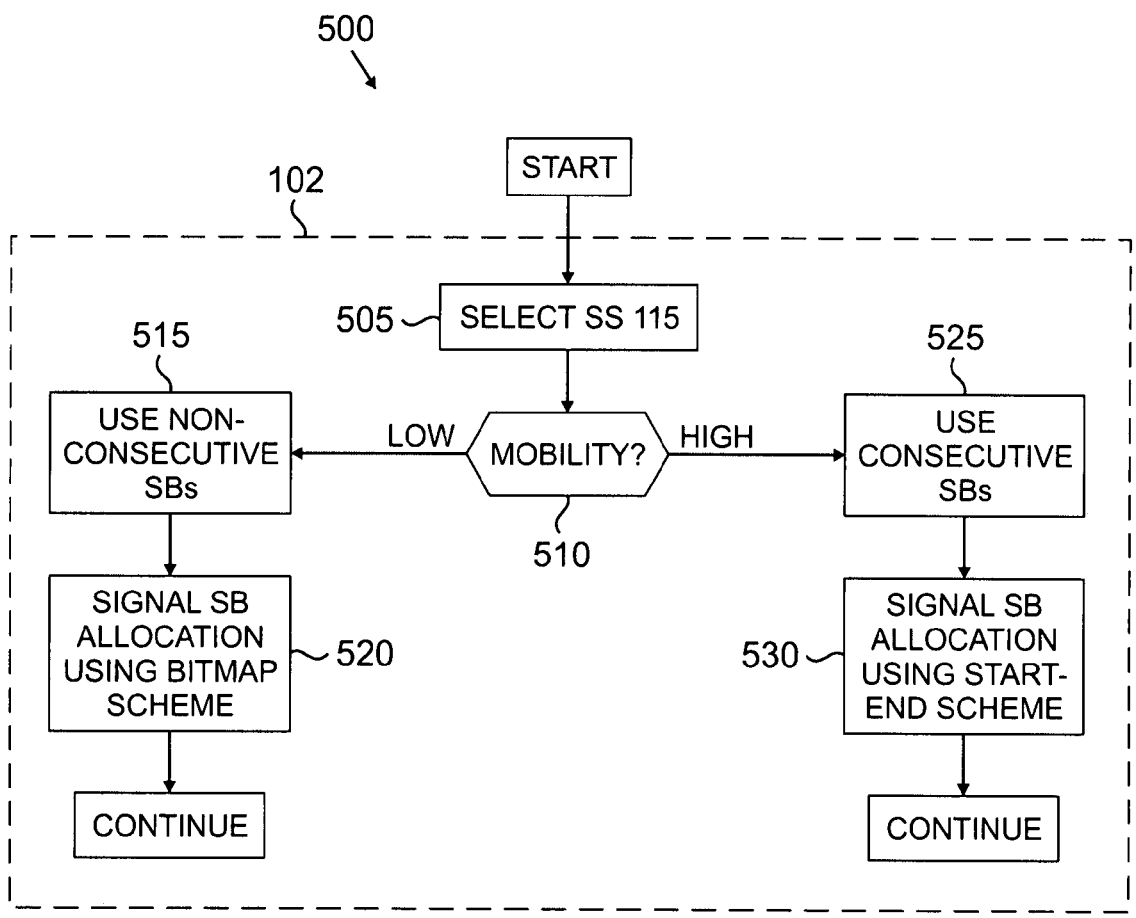
FIG. 5 is a flow diagram illustrating the allocation of subbands according to a second embodiment of the disclosure.
Figure 6:
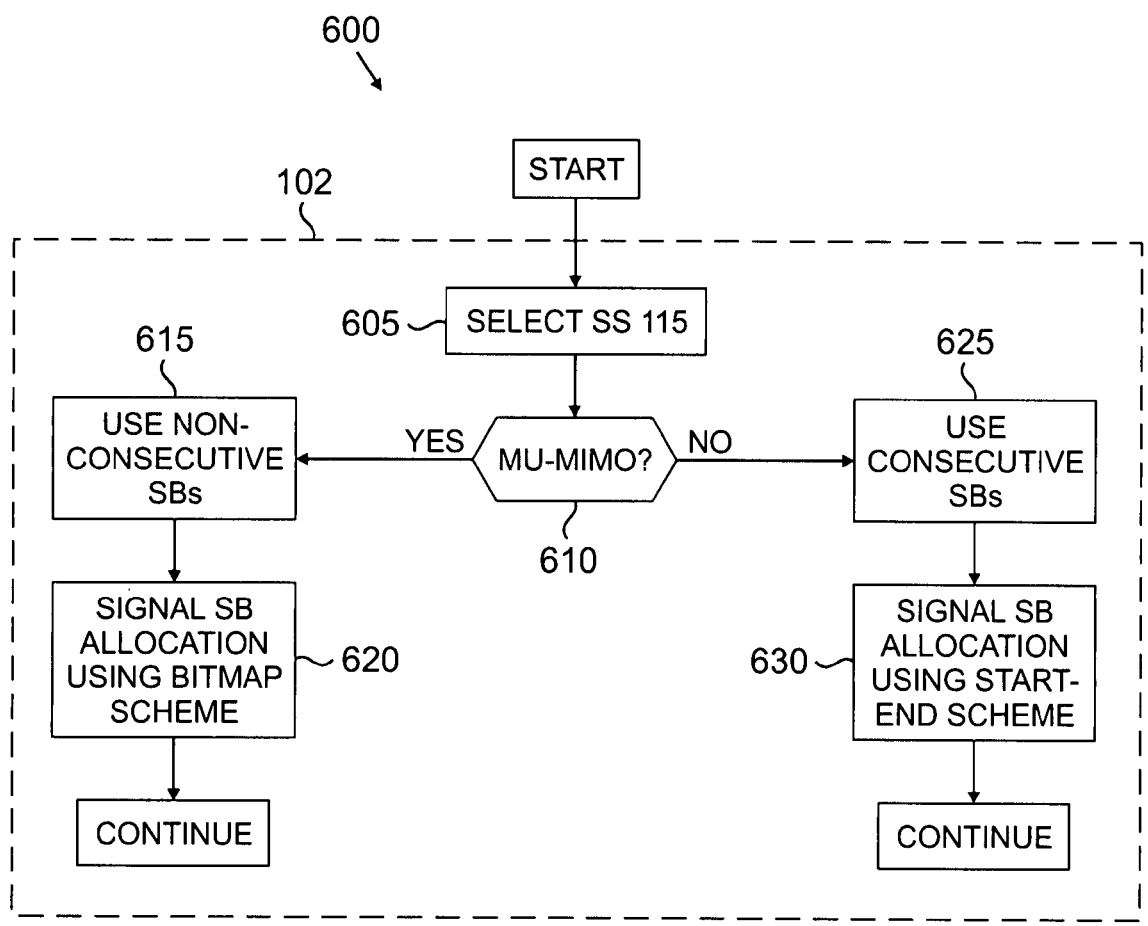
FIG. 6 is a flow diagram illustrating the allocation of subbands according to a third embodiment of the disclosure.

In the present disclosure, a new subband allocation scheme is introduced that adapts to the channel conditions and mobility of subscriber stations. FIGS. 4-6 illustrate the allocation of subbands using either bitmap indicators or start-end indictors, depending on particular parameters. The parameters include SINR, subscriber station mobility, or the use of MU-MIMO antennas.

FIG. 4 depicts flow diagram 400, which illustrates the allocation of subbands according to one embodiment of the present disclosure. In FIG. 4, subbands are allocated based on subscriber station location (i.e., distance from base station) or channel condition, as indicated by the channel quality information, such as the signal-to-interference plus noise ratio (SINR). Subscriber stations that are close to a base station experience better channel quality conditions and, therefore, operate at higher data rates. The higher data rates require transmission over large numbers of subbands. In a frequency-selective channel, allocating a large number of subbands would require allocation of non-consecutive subbands.

Moreover, for strongly received subscriber stations, the signaling overhead is generally smaller. This is due to the fact that power allocated to the control channel depends upon the channel quality of a subscriber station. Therefore, the control channels of strong subscriber stations require a smaller amount of power relative to weak subscriber stations. Therefore, a bitmap indicator is used to allocate subbands to strong subscriber stations. The larger overhead due to the bitmap indicator is compensated by the fact that good subscriber stations require small amounts of power.

Initially, base station (BS) 102 selects subscriber station 115 to transmit or receive (process step 405). Next, BS 102 determines the SINR value associated with SS 115 (process step 410). If the SINR value for SS 115 is relatively high, then BS 102 allocates non-consecutive subbands to SS 115 (process step 415). BS 102 then transmits a control message to SS 115 containing a bitmap indicator that allocates the non-consecutive subbands to SS 115 (process step 420). If the SINR value for SS 115 is relatively low, then BS 102 allocates consecutive subbands to SS 115 (process step 425). BS 102 then transmits a control message to SS 115 containing a start-end indicator that allocates the consecutive subbands to SS 115 (process step 430).

FIG. 5 depicts flow diagram 500, which illustrates the allocation of subbands according to another embodiment of the disclosure. In FIG. 5, subbands are allocated based on subscriber station mobility. High mobility subscriber stations cannot benefit from frequency-selective scheduling. In addition, only lower data rates are supported for high mobility subscriber stations.

Moreover, the control signal overhead is generally higher for high mobility subscriber stations because accurate power allocation to the control channel is not possible due to the inability to track the fast fading at high speeds. Therefore, for high mobility subscriber stations, a consecutive set of subbands may be allocated with a start-end indicator. Another possibility is to use a pre-configured distribution of subbands for high speed subscriber stations and a corresponding resource signaling structure.

Initially, base station (BS) 102 selects subscriber station 115 to transmit or receive (process step 505). Next, BS 102 determines the mobility value (i.e., speed) associated with SS 115 from uplink signals previously received from SS 115 (process step 510). If the mobility value for SS 115 is relatively low, then BS 102 allocates non-consecutive subbands to SS 115 (process step 515). BS 102 then transmits a control message to SS 115 containing a bitmap indicator that allocates the non-consecutive subbands to SS 115 (process step 520). If the mobility value for SS 115 is relatively high, then BS 102 allocates consecutive subbands to SS 115 (process step 525). BS 102 then transmits a control message to SS 115 containing a start-end indicator that allocates consecutive subbands to SS 115 (process step 530).

FIG. 6 depicts flow diagram 600, which illustrates the allocation of subbands according to another embodiment of the disclosure. In FIG. 6, subbands are allocated based on whether base station (BS) 102 operates in a multi-user multiple-input, multiple-output (MU-MIMO) mode. Non-consecutive subbands are allocated for a multi-user MIMO or SDMA (spatial division multiple access) case. On the other hand, consecutive subbands are allocated for a non-MIMO or single user-MIMO case.

Initially, base station (BS) 102 selects subscriber station 115 to transmit or receive (process step 605). Next, BS 102 determines if BS 102 is operating in MU-MIMO mode (process step 610). If BS 102 is operating in MU-MIMO mode, then BS 102 allocates non-consecutive subbands to SS 115 (process step 615). BS 102 then transmits a control message to SS 115 containing a bitmap indicator that allocates the non-consecutive subbands to SS 115 (process step 620). If BS 102 is not operating in MU-MIMO mode, then BS 102 allocates consecutive subbands to SS 115 (process step 625). BS 102 then transmits a control message to SS 115 containing a start-end indicator that allocates consecutive subbands to SS 115 (process step 630).

According to an exemplary embodiment, the same time-frequency resource may be used for the control channel regardless whether the subband allocation control signaling uses a bitmap indicator or a start-end indicator. A higher coding rate and/or higher modulation order may be required for a bitmap indicator due to the larger number of signaling bits required. However, since a non-consecutive bitmap indictor is only used for good channel quality or low mobility subscriber stations only, the power required for the control signaling is generally smaller. Therefore, the penalty incurred by a higher coding rate and/or higher modulation order will not significantly increase the signaling overhead.

The signaling message type (i.e., bitmap versus start-end) for different subscriber stations may be configured by higher layer signaling. If dynamic switching between a bitmap indicator and a start-end indicator is necessary, blind detection of at least two signaling message formats—one for bitmap and one for start-end—may be performed in the subscriber stations.

Figure 7:
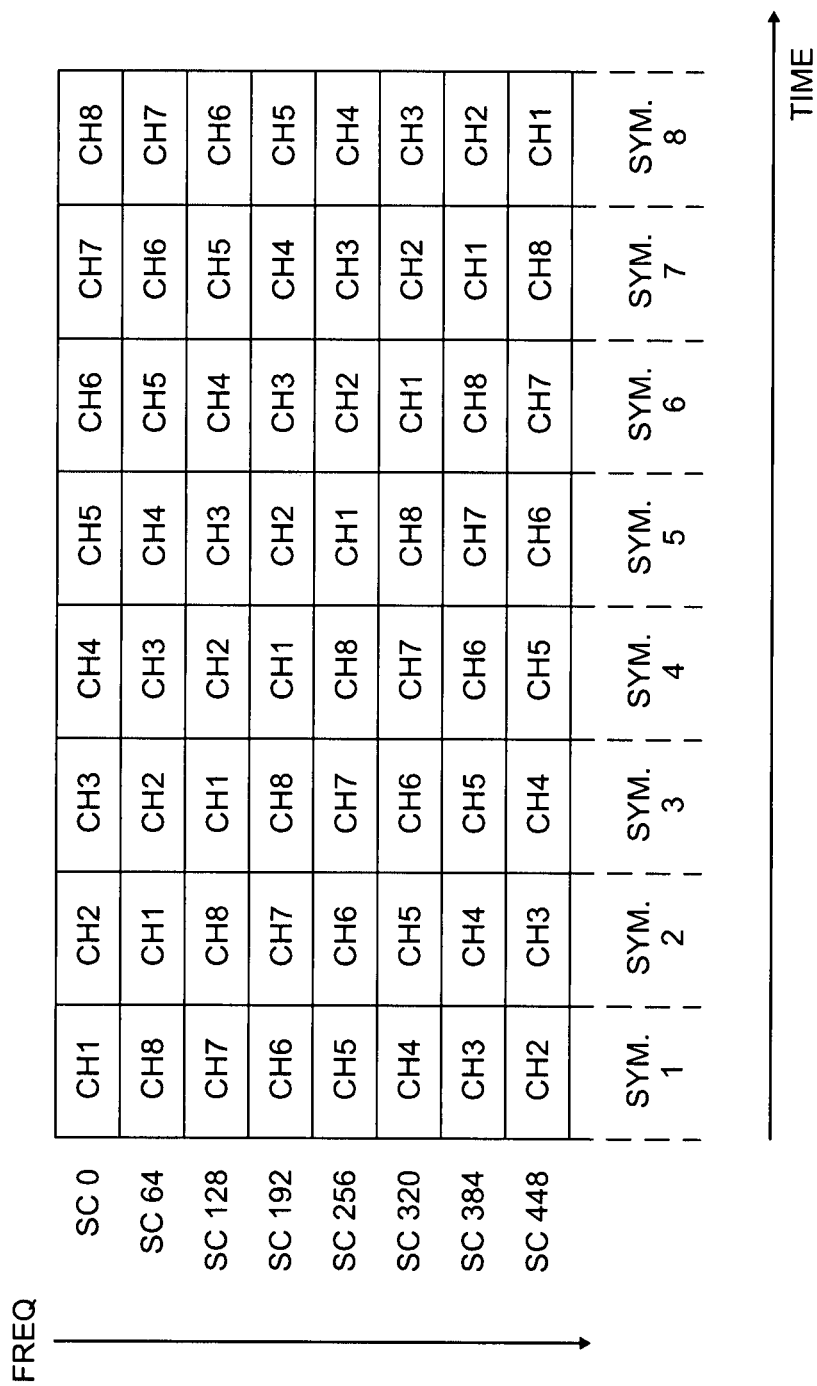
FIG. 7 illustrates an exemplary time-frequency grid for transmitting in logical uplink channels in the wireless network according to one embodiment of the disclosure.

FIG. 7 illustrates an exemplary time-frequency grid for transmitting in logical uplink channels in wireless network 100 according to one embodiment of the present disclosure. In the example in FIG. 7, it is assumed that OFDM symbols are transmitted in a transmission time interval (TTI). The TTI has a length of 0.5 milliseconds and each OFDM symbol comprises 512 subcarriers. In order to provide frequency-diversity, every $64^{th}$ subcarrier is used for a given logical channel. The logical channels are defined by a specific mapping to the time-frequency grid in FIG. 7. For example, logical channel CH1 uses subcarriers SC 0, SC 64, SC 128, SC 256, SC 320, SC 384, and SC 448 in OFDM symbols 1, 2, 3, 4, 5, 6, 7 and 8 respectively. Similarly, logical channel CH2 uses subcarriers SC 0, SC 64, SC 128, SC 256, SC 320, SC 384, and SC 448 in OFDM symbols 2, 3, 4, 5, 6, 7, 8, and 1, respectively. In this mapping scheme, each logical channel benefits from both frequency-diversity and time-diversity.

Figure 8:
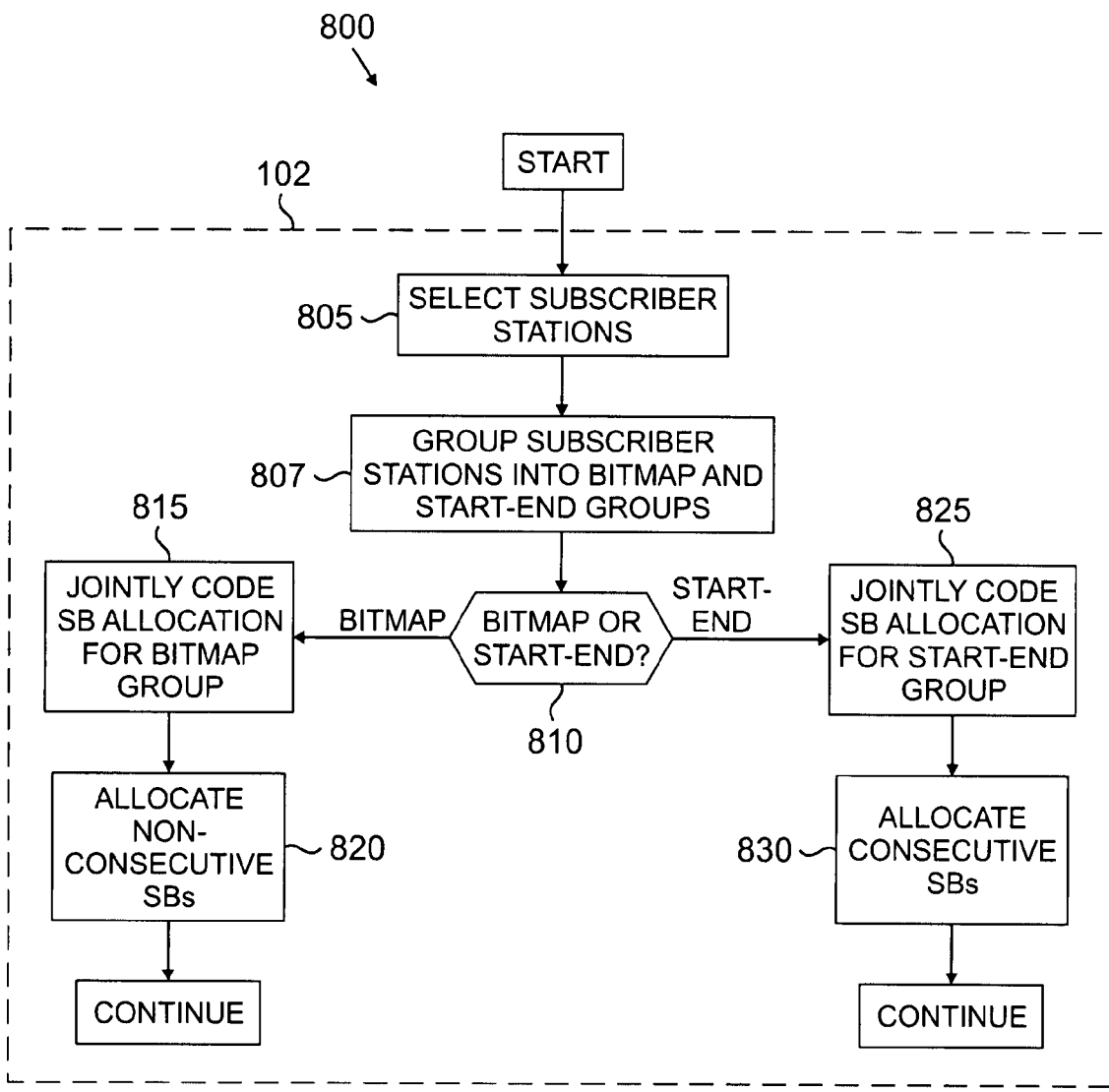
FIG. 8 is a flow diagram illustrating the allocation of subbands according to one embodiment of the disclosure.

FIG. 8 depicts flow diagram 800, which illustrates the allocation of subbands according to another embodiment of the disclosure. In FIG. 8, subbands are allocated based on subscriber station groups. Subscriber stations are grouped into two groups. One group is allocated non-consecutive subbands and receives control channel messages that use bitmap indicators to allocate the subbands. The other group is allocated consecutive subbands and receives control channel messages that use start-end indicators to allocate the subbands.

The groups may be based on one or more of the criteria discussed in FIGS. 4-6, including SINR (i.e., location), mobility, and MU-MIMO mode. The signaling information for each of the two groups is separately encoded and modulated. However, the signaling information for subscriber stations within each group is jointly encoded.

Initially, base station (BS) 102 selects a plurality of subscriber stations to transmit or receive (process step 805). Next, BS 102 sorts each of the selected subscriber stations into one of two groups, a bitmap indicator group or a start-end indicator group, according to one or more of the criteria: SINR (i.e., location), mobility, and MU-MIMO mode (process step 807).

If a group is a bitmap indicator group, BS 102 jointly codes the subband allocation information into a bitmap indicator in the control message (process steps 810 and 815). BS 102 then transmits the control message to allocate the non-consecutive subbands (process step 820).

If a group is a start-end indicator group, BS 102 jointly codes the subband allocation information into a start-end indicator in the control message (process steps 810 and 825). BS 102 then transmits the control message to allocate the consecutive subbands (process step 830).

Figure 9:
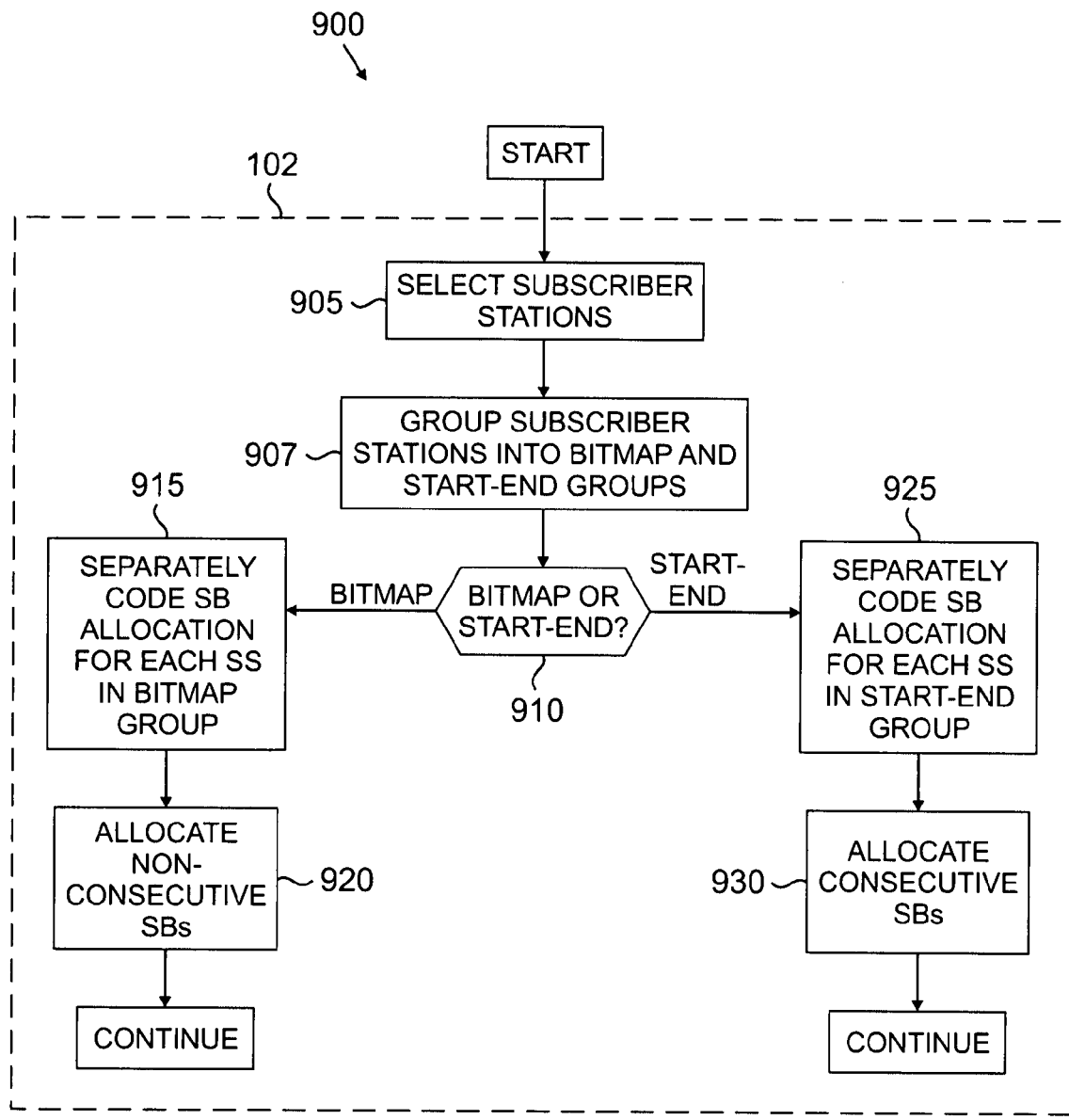
FIG. 9 is a flow diagram illustrating the allocation of subbands according to another embodiment of the disclosure.

FIG. 9 depicts flow diagram 900, which illustrates the allocation of subbands according to another embodiment of the disclosure. In FIG. 9, subbands are allocated based on subscriber station groups, as in FIG. 8. However, in FIG. 9, the signaling information for each subscriber station within each group is separately encoded. The subscriber station grouping may be indicated via higher layer signaling in which case, each subscriber station decodes a signaling message either in bitmap format or start-end format. Alternatively, each subscriber station may decode the signaling messages both in bitmap format and start-end format. The format of the signaling message and hence the subband allocation type is then determined as the result of signaling decoding.

Initially, base station (BS) 102 selects a plurality of subscriber stations to transmit or receive (process step 905). Next, BS 102 sorts each of the selected subscriber stations into one of two groups, a bitmap indicator group or a start-end indicator group, according to one or more of the criteria: SINR (i.e., location), mobility, and MU-MIMO mode (process step 907).

If a group is a bitmap indicator group, BS 102 separately codes the subband allocation information for each subscriber station into a bitmap indicator in the control message (process steps 910 and 915). BS 102 then transmits the control message to allocate the non-consecutive subbands (process step 920).

If a group is a start-end indicator group, BS 102 separately codes the subband allocation information for each subscriber station into a start-end indicator in the control message (process steps 910 and 925). BS 102 then transmits the control message to allocate the consecutive subbands (process step 930).

Figure 10:
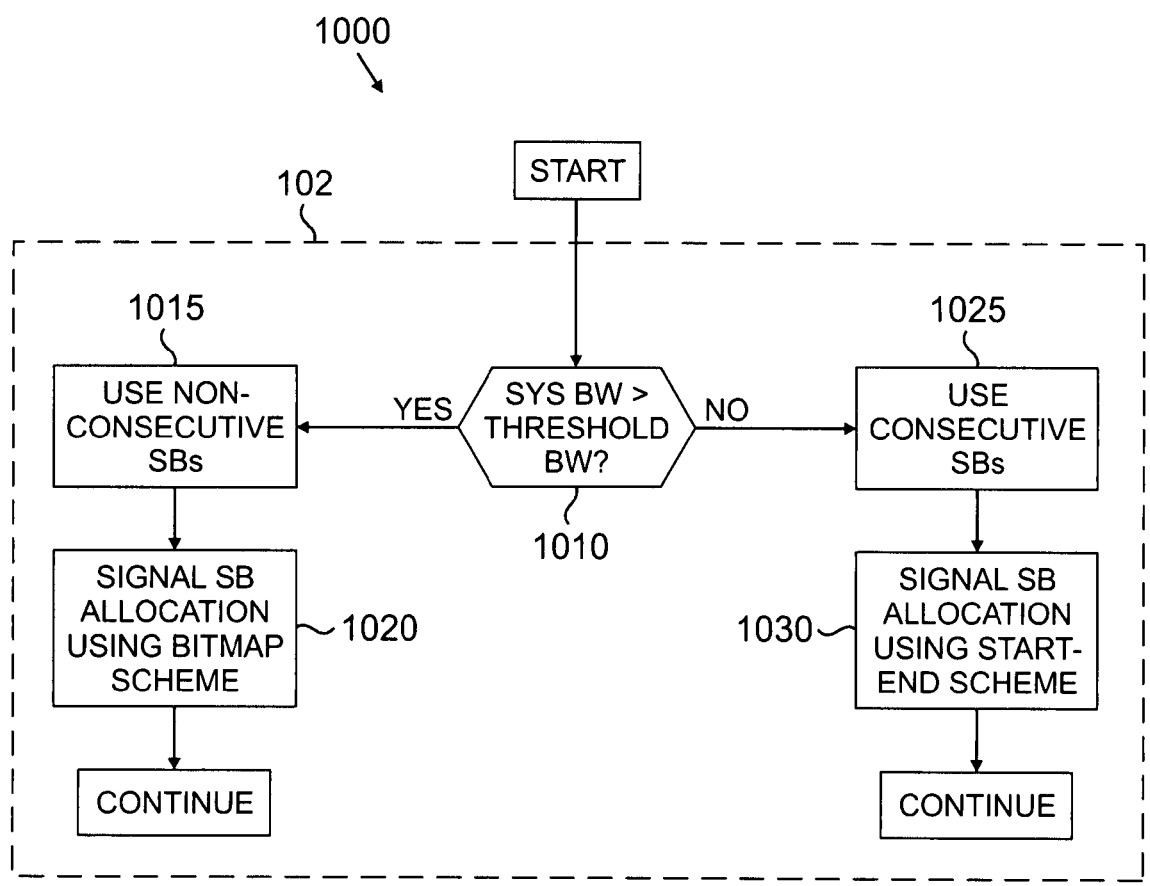
FIG. 10 is a flow diagram illustrating the allocation of subbands according to another embodiment of the disclosure.

FIG. 10 depicts flow diagram 900, which illustrates the allocation of subbands according to another embodiment of the disclosure. In FIG. 10, the decision between consecutive and non-consecutive subband allocation is based on the system bandwidth used. In general, the signaling overhead is lower with a start-end indicator when the total number of subbands is large. For the case of small number of subbands, the difference in signaling overhead between a start-end indicator for consecutive subband allocation and a bitmap indicator for non-consecutive subband allocation is small. For example, for a total of four (4) subbands, the bitmap approach and the start-end approach both need 4-bits of signaling information. In case of three (3) subbands, the bitmap approach needs 3 bits of signaling information while the start-end approach requires 4 bits of signaling information.

In general, the number of resource blocks is a function of the system bandwidth. The larger the system bandwidth, the larger the number of total subbands. A threshold bandwidth is used to determine whether a bitmap indicator or a start-end indicator should be used for subband allocation signaling.

Initially, BS 102 determines if the system bandwidth is greater than the threshold bandwidth (process step 1010). If the system bandwidth is greater than the threshold bandwidth, BS 012 allocates non-consecutive subbands to the subscriber stations (process step 1015). BS 102 then transmits a control message containing a bitmap indicator to allocate the non-consecutive subbands (process step 1020). If the system bandwidth is not greater than the threshold bandwidth, BS 012 allocates consecutive subbands to the subscriber stations (process step 1025). BS 102 then transmits a control message containing a start-end indicator to allocate the nonconsecutive subbands (process step 1030).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station configured to operate in a network, the base station comprising:
   at least one transmitter configured to communicate with a plurality of subscriber stations in a coverage area of the network, the base station configured to allocate subbands to the plurality of subscriber stations for communication in an uplink and in a downlink, each of the subbands comprising a group of contiguous subcarriers,
   wherein the base station is configured to determine whether to allocate either i) a plurality of consecutive subbands or ii) a plurality of non-consecutive subbands to a first subscriber station according to at least one selectable criteria comprising a channel quality value associated with the first subscriber station,
   wherein the base station is configured to allocate to the first subscriber station one of the plurality of consecutive subbands and the plurality of non-consecutive subbands according to the at least one selectable criteria,
   wherein the base station is configured to allocate the plurality of non-consecutive subbands to the first subscriber station if the channel quality value is relatively high and to allocate the plurality of consecutive subbands to the first subscriber station if the channel quality value is relatively low,
   wherein the base station is configured to indicate the allocation of either the plurality of consecutive subbands or the plurality of non-consecutive subbands based on the determination using a format of a signaling message, and
   wherein the base station is configured to indicate allocation of the plurality of non-consecutive subbands to the first subscriber station using a bitmap indicator and to indicate allocation of the plurality of consecutive subbands to the first subscriber station using a start-end indicator.

2. The base station as set forth in claim 1, wherein the at least one selectable criteria comprises a mobility value associated with the first subscriber station.

3. The base station as set forth in claim 1, wherein the at least one selectable criteria comprises an operating mode of the base station.

4. A base station configured to operate in a network, the base station comprising:
   at least one transmitter configured to communicate with a plurality of subscriber stations in a coverage area of the network, the base station configured to allocate subbands to the plurality of subscriber stations for communication in an uplink and in a downlink, each of the subbands comprising a group of contiguous subcarriers,
   wherein the base station is configured to determine whether to allocate either i) a plurality of consecutive subbands or ii) a plurality of non-consecutive subbands to a first subscriber station according to at least one selectable criteria comprising a mobility value associated with the first subscriber station, wherein the base station is configured to allocate to the first subscriber station one of the plurality of consecutive subbands and the plurality of non-consecutive subbands according to the at least one selectable criteria, wherein the base station is configured to allocate the plurality of non-consecutive subbands to the first subscriber station if the mobility value is relatively low and to allocate the plurality of consecutive subbands to the first subscriber station if the mobility value is relatively high, wherein the base station is configured to indicate the allocation of either the plurality of consecutive subbands or the plurality of non-consecutive subbands based on the determination using a format of a signaling message, and wherein the base station is configured to indicate allocation of the plurality of non-consecutive subbands to the first subscriber station using a bitmap indicator and to indicate allocation of the plurality of consecutive subbands to the first subscriber station using a start-end indicator.

5. The base station as set forth in claim 4, wherein the base station is configured to allocate the plurality of non-consecutive subbands to the first subscriber station using the bitmap indicator and to allocate the plurality of consecutive subbands to the first subscriber station using the start-end indicator.

6. A base station configured to operate in a network, the base station comprising:

at least one transmitter configured to communicate with a plurality of subscriber stations in a coverage area of the network, the base station configured to allocate subbands to the plurality of subscriber stations for communication in an uplink and in a downlink, each of the subbands comprising a group of contiguous subcarriers, wherein the base station is configured to determine whether to allocate either i) a plurality of consecutive subbands or ii) a plurality of non-consecutive subbands to a first subscriber station according to at least one selectable criteria comprising a mobility value associated with the first subscriber station, wherein the base station is configured to allocate to the first subscriber station one of the plurality of consecutive subbands and the plurality of non-consecutive subbands according to the at least one selectable criteria, wherein the base station is configured to allocate the plurality of non-consecutive subbands to the first subscriber station if the base station is operating in multi-user multiple-input, multiple-output (MU-MIMO) mode and to allocate the plurality of consecutive subbands to the first subscriber station if the base station is not operating in MU-MIMO mode, wherein the base station is configured to indicate the allocation of either the plurality of consecutive subbands or the plurality of non-consecutive subbands based on the determination using a format of a signaling message, and wherein the base station is configured to indicate allocation of the plurality of non-consecutive subbands to the first subscriber station using a bitmap indicator and to indicate allocation of the plurality of consecutive subbands to the first subscriber station using a start-end indicator.

7. The base station as set forth in claim 6, wherein the base station is configured to allocate the plurality of non-consecutive subbands to the first subscriber station using the bitmap indicator and to allocate the plurality of consecutive subbands to the first subscriber station using the start-end indicator.

8. A network configured to communicate with subscriber stations in a coverage area of the network, the network comprising:

a plurality of base stations, wherein each of the base stations is configured to allocate subbands to a plurality of subscriber stations for communication in an uplink and a downlink, each of the subbands comprising a group of contiguous subcarriers, wherein each of the base stations is configured to determine whether to allocate either: i) a plurality of consecutive subbands or ii) a plurality of non-consecutive subbands to a first subscriber station according to at least one selectable criteria comprising a channel quality value associated with the first subscriber station, wherein each base station is configured to allocate to the first subscriber station either the plurality of consecutive subbands or the plurality of non-consecutive subbands according to the at least one selectable criteria, wherein each base station is configured to allocate the plurality of non-consecutive subbands to the first subscriber station if the channel quality value is relatively high and to allocate the plurality of consecutive subbands to the first subscriber station if the channel quality value is relatively low, wherein each base station is configured to indicate the allocation of either the plurality of consecutive subbands or the plurality of non-consecutive subbands based on the determination using a format of a signaling message, and wherein each of the base stations is configured to indicate allocation of the plurality of non-consecutive subbands to the first subscriber station using a bitmap indicator and to indicate allocation of the plurality of consecutive subbands to the first subscriber station using a start-end indicator.

9. The network as set forth in claim 8, wherein the at least one selectable criteria comprises a mobility value associated with the first subscriber station.

10. The network as set forth in claim 8, wherein the at least one selectable criteria comprises an operating mode of the each base station.

11. A network configured to communicate with subscriber stations in a coverage area of the network, the network comprising:

a plurality of base stations, wherein each of the base stations is configured to allocate subbands to a plurality of subscriber stations for communication in an uplink and a downlink, each of the subbands comprising a group of contiguous subcarriers, wherein each of the base stations is configured to determine whether to allocate either: i) a plurality of consecutive subbands or ii) a plurality of non-consecutive subbands to a first subscriber station according to at least one selectable criteria comprising a mobility value associated with the first subscriber station, wherein each base station is configured to allocate to the first subscriber station either the plurality of consecutive subbands or the subbands according to the at least one selectable criteria, wherein each base station is configured to allocate the plurality of non-consecutive subbands to the first subscriber station if the mobility value is relatively low and to allocate the plurality of consecutive subbands to the first subscriber station if the mobility value is relatively high, wherein each base station is configured to indicate the allocation of either the plurality of consecutive subbands or the plurality of non-consecutive subbands based on the determination using a format of a signaling message, and wherein each of the base stations is configured to indicate allocation of the plurality of non-consecutive subbands to the first subscriber station using a bitmap indicator and to indicate allocation of the plurality of consecutive subbands to the first subscriber station using a start-end indicator.

12. The network as set forth in claim 11, wherein the each base station is configured to allocate the plurality of non-consecutive subbands to the first subscriber station using the bitmap indicator and to allocate the plurality of consecutive subbands to the first subscriber station using the start-end indicator.

13. The network configured to communicate with subscriber stations in a coverage area of the network, the network comprising:

a plurality of base stations, wherein each of the base stations is configured to allocate subbands to a plurality of subscriber stations for communication in an uplink and a downlink, each of the subbands comprising a group of contiguous subcarriers, wherein each of the base stations is configured to determine whether to allocate either: i) a plurality of consecutive subbands or ii) a plurality of non-consecutive subbands to a first subscriber station according to at least one selectable criteria comprising an operating mode of the each base station, wherein each base station is configured to allocate to the first subscriber station either the plurality of consecutive subbands or the plurality of non-consecutive subbands according to the at least one selectable criteria, wherein each base station is configured to allocate the plurality of non-consecutive subbands to the first subscriber station if the each base station is operating in multi-user multiple-input, multiple-output (MU-MIMO) mode and to allocate the plurality of consecutive subbands to the first subscriber station if the each base station is not operating in MU-MIMO mode, wherein each base station is configured to indicate the allocation of either the plurality of consecutive subbands or the plurality of non-consecutive subbands based on the determination using a format of a signaling message, and wherein each of the base stations is configured to indicate allocation of the plurality of non-consecutive subbands to the first subscriber station using a bitmap indicator and to indicate allocation of the plurality of consecutive subbands to the first subscriber station using a start-end indicator.

14. The network as set forth in claim 13, wherein the each base station is configured to allocate the plurality of non-consecutive subbands to the first subscriber station using the bitmap indicator and is configured to allocate the plurality of consecutive subbands to the first subscriber station using the start-end indicator.

* * * * *